United States Patent [19]

Uhing

[11] 4,253,342
[45] Mar. 3, 1981

[54] ARRANGEMENT FOR TRANSFORMING A ROTARY MOVEMENT OF A SMOOTH SHAFT INTO A THRUST MOVEMENT OF A ROLLING NUT

[76] Inventor: Joachim Uhing, Dorfstede 34, D-2300 Molfsee üb. Kiel, Fed. Rep. of Germany

[21] Appl. No.: 882,938

[22] Filed: Mar. 2, 1978

[30] Foreign Application Priority Data

Mar. 2, 1977 [DE] Fed. Rep. of Germany ....... 2709006

[51] Int. Cl.³ .......................................... F16H 21/16
[52] U.S. Cl. .......................................... 74/89; 74/25
[58] Field of Search ........... 74/57, 59, 89.15, 424.8 R, 74/424.8 B, 424.8 C, 441, 459, 499, 509, 25, 89

[56] References Cited

U.S. PATENT DOCUMENTS

| | | | |
|---|---|---|---|
| 2,482,082 | 9/1949 | Wahlberg | 74/424.8 C |
| 2,616,302 | 11/1952 | Wahlmark | 74/424.8 C |
| 2,940,322 | 6/1960 | Uhing | 74/25 X |
| 2,961,887 | 11/1960 | Long | 74/424.8 R |
| 3,589,202 | 6/1971 | Stanley | 74/25 |
| 3,590,644 | 7/1971 | Kuspert | 74/57 |
| 3,614,900 | 10/1971 | Wahlmark | 74/424.8 R |
| 3,698,258 | 10/1972 | Gartner | 74/89.15 R |
| 3,730,016 | 5/1973 | Miller | 74/424.8 B |
| 3,977,258 | 8/1976 | Bauer | 74/25 |
| 4,008,929 | 2/1977 | Olrik | 74/25 X |

FOREIGN PATENT DOCUMENTS

| | | | |
|---|---|---|---|
| 679323 | 2/1964 | Canada | 74/424.8 R |
| 1057411 | 5/1959 | Fed. Rep. of Germany | |
| 1210647 | 2/1966 | Fed. Rep. of Germany | |
| 1905529 | 10/1969 | Fed. Rep. of Germany | 74/89 |

Primary Examiner—Lawrence J. Staab
Attorney, Agent, or Firm—Michael J. Striker

[57] ABSTRACT

The arrangement for transforming rotary movement of a smooth shaft into a thrust movement by means of a rolling nut that comprises a housing and, within the housing, four inclined roller cages each defining a center passage having an inside diameter larger than the diameter of the shaft and each engaging an arcuate surface section of the shaft; the end points of the section of engagement forming with the center point of the corresponding roller cage a bevel angle within the range of 60° and the distance between the two points being sufficient for insuring a stable position of each cage on the shaft even if the cages are loaded laterally. The intermediate two roller cages are urged in contact with the shaft by a pair of springs, respectively.

10 Claims, 4 Drawing Figures

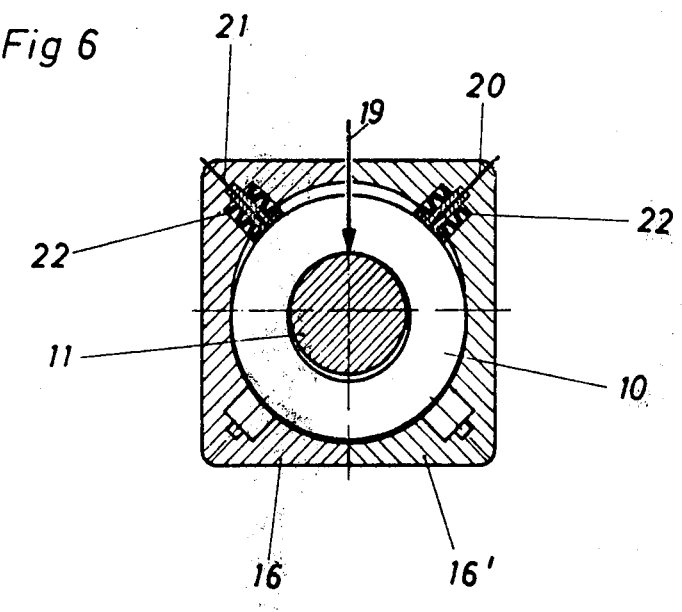

ARRANGEMENT FOR TRANSFORMING A ROTARY MOVEMENT OF A SMOOTH SHAFT INTO A THRUST MOVEMENT OF A ROLLING NUT

BACKGROUND OF THE INVENTION

This invention relates generally to an arrangement for transforming a rotary movement of a smooth shaft into a thrust movement of a nut and more specifically, the invention relates to a roller nut for effecting such transformation. The roller nut employed in the arrangement according to this invention is of the type where several roller cages having annular configuration surround the shaft at different angles to each other and are held together in a common housing whereby center passages of the roller cages are in engagement with the smooth surface of the shaft.

In the construction of machines and apparatuses, screws are frequently needed that should be capable of providing thrust movements over long distances. The machining of threads for the long screws of this type brings along several difficulties, especially when the screws are supposed to have a high degree of accuracy so that neither play nor wear between the bolt and nut take place. It is also frequently required that the bolt and nut arrangement of this kind have a smooth cooperation with minimum friction.

Screw or bolt nuts have been known which employ rolling elements arranged for rolling in correspondingly formed grooves in the bolt and/or in the nut, thus avoiding any sliding movement and thereby also the wear. As an example of this known type are circulating on cyclic bolt nuts in which the bolts upon completion of one or more turns of the thread are guided to return to the beginning of the thread. Such screw drives however are hard to manufacture and consequently very expensive so that in many cases they cannot be used.

Known are also frictional screws consisting of one or more rings which are pressed by resilient forces against the smooth surface of the shaft in such a manner as to be able to perform a screw-like motion when the planes of the rings and of the shaft intersect each other at the same angle.

For example, in the German Pat. No. 1,057,411 a roller ring drive is described in which the aforementioned angles are adjustable so that the screw motion has an adjustable pitch. Nevertheless, technological expenses in making this embodiment of drives having minimum sliding friction are too high even if a screw motion having a single fixed pitch only is to be designed. Moreover, the drives having an adjustable pitch angle have the disadvantage that the shaft is displaced laterally from the center of the ring if transverse forces act against the ring and no additional guide between the ring housing and the shaft is provided. It is true that the rings lying upon the shaft are in balance due to their contact pressure but they do not have a stable transverse position since the almost punctiform line or area of their rolling contact lies on the swing axis of the rings. Consequently, additional lateral guides are necessary in which, however, sliding motions with frictional losses will result and also the wear. In roller ring drives having three rings the center ring is twice as much loaded as the two outer rings (FIG. 3 of the German Patent No. 1, 057 411). The maximum rolling capacity is thereby determined by the allowable specific surface pressure in the point or line of rolling and by the bearing strength or capacity of the inner ring. Since, as mentioned above, the prior art rings bear against the shaft almost at one point only, the contact pressure forces are distributed on the ring supporting balls more irregularly than in the case of a simple support of the shaft where the shaft occupies the entire inner ring. For this reason the bearing capacity or the strength of the bearing cannot be fully utilized.

SUMMARY OF THE INVENTION

It is, accordingly, an object of this invention to overcome the disadvantages of the prior art.

More particularly, it is an object of the present invention to provide an improved roller or rolling nut having only one frictional thread lead for attaining an increased thrust force.

Another object of this invention is to provide a rolling nut wherein the position of the shaft relative to the nut is stable even against transversely or laterally acting forces.

Still another object of this invention is to provide a rolling nut that is assembled of simple parts, is easily accessible and occupies a small space only.

In pursuance of the above objects, and others which will become apparent hereafter, one feature of this invention resides, briefly stated, in an arrangement where the contact line or area between a roller cage or ring and the shaft is made as large as possible but the bevel angle defined by the end points of the contact line and the center point of the roller ring is within the range of 60°.

In a preferred embodiment of this invention the housing of the roller nut is assembled of two equal parts whereby the dividing surface of the two housing halves lies in a plane passing through the axis of the shaft and the center of the rolling surfaces. The resulting parts of the housing have the same configuration and are interchangeable.

The novel features which are considered as characteristic for the invention are set forth in particular in the appended claims. The invention itself, however, both as to its construction and its method of operation, together with additional objects and advantages thereof will be best understood from the following description in specific embodiments when read in conjunction with the accompanying drawings.

BRIEF DESCRIPTION OF THE DRAWING

FIG. 6 is a sectional front view of a modification of the roller nut of this invention.

DESCRIPTION OF THE PREFERRED EMBODIMENTS

Figure 1:
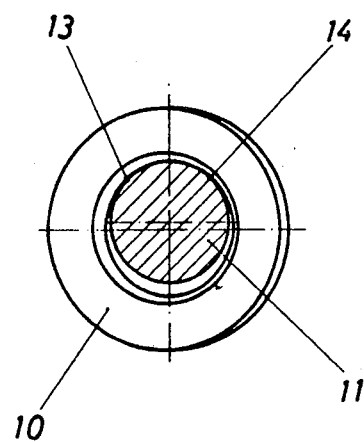
FIG. 1 shows in a front view, partly in section, the bevel angle defined by the contact line between the shaft and a roller ring or roller cage and the center of the shaft in the arrangement of this invention.
Figure 2:
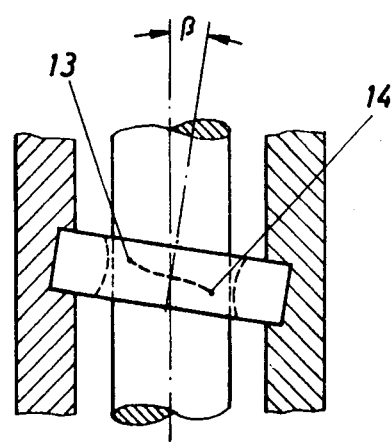
FIG. 2 is a plan cut-away view, partly in section, of the rolling nut of this invention.

FIGS. 1 and 2 show a roller ring or roller cage 10 surrounding a smooth shaft 11 and having larger inside diameter than the diameter of the shaft. As seen from FIG. 2, the axis of the shaft 11 is deviated about a pitch angle beta from the center axis of the roller cage 10. The inside diameter of the roller cage 10, the diameter of the shaft 11 and the shape of the rolling surface of the cage 10 are designed so that the roller ring is in contact with the shaft surface not at one point but on a relatively long arc defined by end points 13 and 14. By means of this relatively long line of contact, the position of the shaft relative to the ring is stabilized also against transverse forces. Also the contact presses are transferred to a larger section of the roller ring or cage via the inner ring section, the rolling bodies and the outer ring of the roller cage. Consequently, the rolling cage has an increased load capacity.

Theoretically, the sliding surface of the rolling cage 10 and its inside diameter might be selected so that the beveled angle between the end points 13 and 14 of the contact surface between the cage 10 and the shaft 11 and the center of the ring 10 be almost 180°. This ideal case, however, cannot be realized for the reason that the velocity of rolling is different in each point on the surface of rolling.

For example, in the center of the surface of rolling or of contact, the velocity has its maximum; if the point in the rolling surface is shifted about 90° relative to the center point, the velocity is zero. Naturally, two bodies may roll properly one upon the other only then, when the points of their contact have the same velocities. In this case the condition for the satisfactory rolling action is not fulfilled and besides the rolling friction there result also sliding frictions which increase proportionally to the velocity differences. From experience the deviations of rolling velocities should not exceed the center rolling velocity by ±6 percent.

The thrust of feed velocity in roller ring drives is determined as known by mathematical relation $V_o = K \cdot \tan \beta$ whereby the factor K includes the constant magnitudes of the rotation rate and the diameter of the shaft. $\beta$, as mentioned above, is the angle between the axis of the roller ring and the axis of the shaft.

Figure 3:
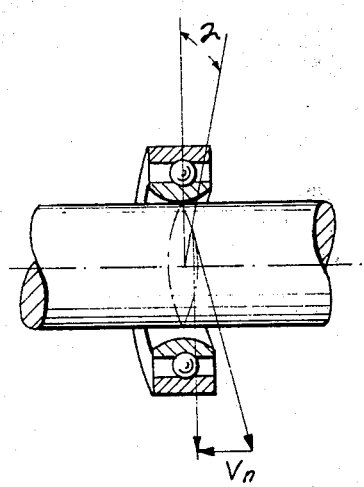
FIG. 3 is a perspective view partly in section of a roller cage in contact with the shaft.
Figure 3A:
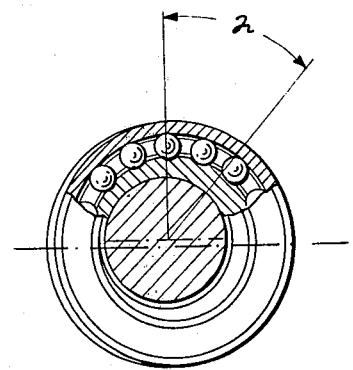
FIG. 3a is a front view, partly in section, of the arrangement of FIG. 3.
Figure 3B:
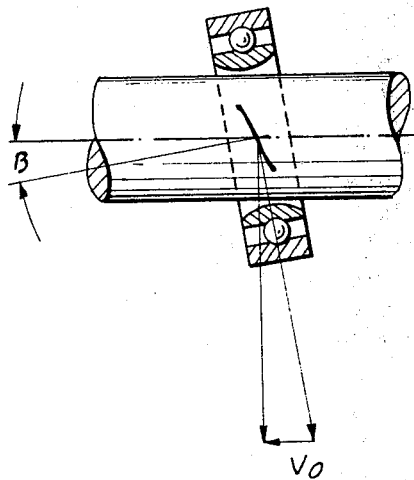
FIG. 3b is a side view, partly in section, of the arrangement of FIG. 3 during rotation of the threaded shaft.

If a rolling point n is located at a distance defined by angle $\gamma$ (FIG. 3) from the center of the rolling surface or arc 13 and 14, the thrust- or feed velocity $V_n$ in the point n is $V_n = K \cdot \tan \beta \cdot \cos \gamma$. For the allowable deviation of about ±6%, there results for the cosinus $\gamma$ a value of $1 - 2 \cdot 0.06 = 0.88$ and therefrom the value of the largest permissible angle $\gamma$ is 28.2° and for the entire length of the rolling surface between the points 13 and 14, the value $2 \times 28.2 = 56.4°$. From this computation it is apparent that the bevel angle between the ring 10 and the shaft 11 should be selected as large as possible but it may not exceed an arc of about 60° if the deviation between the velocities in the surface of contact and the center velocity is to be kept within the limits of ±6 percent.

In known roller ring drives each roller ring has its own housing which again is swingably supported in a common housing. The common housing takes upon itself all forces that result due to the contact pressure between respective roller rings and the shaft. In contrast, in the roller nut according to this invention the roller rings or roller cages need not be swingably supported in the common housing since the pitch angle $\beta$ is to be kept constant. Separate housings for the roller cages are no longer needed when the roller cages are directly supported in the common housing. The division of the common housing, which is necessary for the installation of the roller cages, is according to this invention designed so that the two parts of the housing are equal and interchangeable. By this advantageous measure the manufacture of the housing is substantially simplified since for example each rolling nut is assembled only of two kinds of components, namely of roller cages and of common housing parts.

Figure 4:
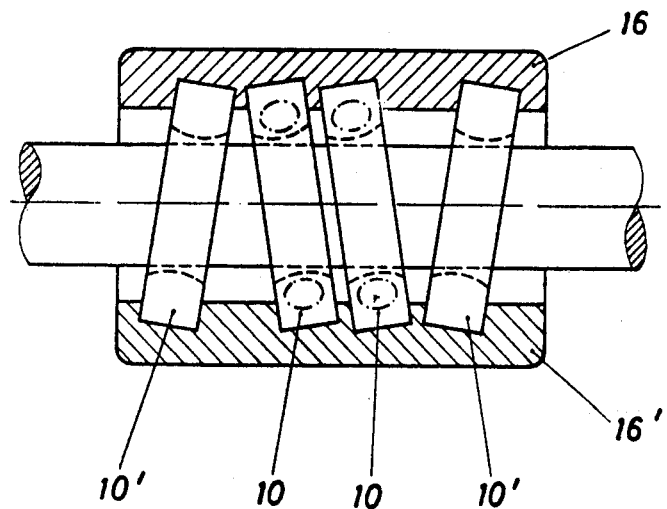
FIG. 4 is a side view, partly in section, of an embodiment of the roller nut of this invention.
Figure 5:
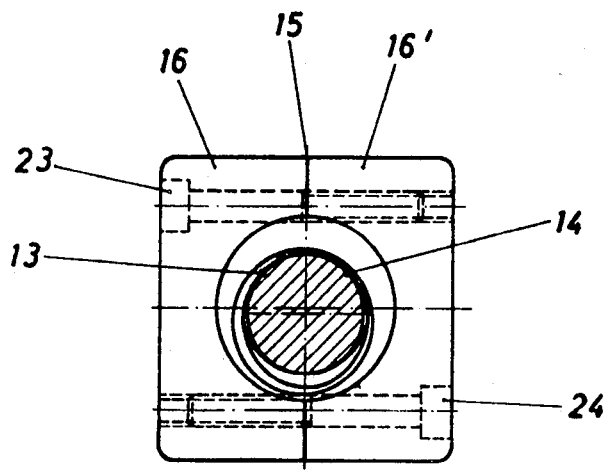
FIG. 5 is a front view of the nut of FIG. 4.

FIGS. 4 and 5 illustrate the common housing 16 and the position of the roller rings or roller cages 10 in one of the housing halves. In this example there are employed four roller cages 10. The pressure forces between the roller rings and the shaft are generated by elastical elements such as springs of resilient materials.

In the embodiment shown in FIG. 6 the two intermediate roller cages 10 are passed against the shaft 11 by two pressure springs 22 located in recesses 20 and 21. The recesses are provided in each corner of housing parts 16, and 16' and are directed about an angle of 45° to the center of the housing. This space saving arrangement permits the application of a maximum spring volume since the edges of the rectangular housing 16 offer the required space and therefore no additional space is necessary. By arrow 19 is indicated the resulting force component of the two pressure springs 20 and 21 acting each at approximately 45° against the roller ring or cage 10 and the shaft 11.

In rolling nuts having the rolling cages as disclosed for example in the German Pat. No. 1 210 647 an intermediate rolling cage is pressed by springs against the shaft and the reaction force is transferred from the opposite side to the lateral or outer rolling rings and therefrom to the common housing.

In the device according to this invention two intermediate rollers 10 arranged in accordance with FIGS. 4 and 6, are pressed against the shaft 11 and the reaction forces are taken on by the lateral roller rings or cages 10'. The contact forces in all four roller cages become equal and the utilization of the permissible load upon the roller cages is optimum. For example, the rolling nut having four roller cages may be loaded twice as much as the nut having only three roller cages.

It is necessary however that in both cases, namely in nuts having three as well as four roller cages, the cages be so arranged within the common housing that they contact minute surfaces on the shaft and at the same time that they be well guided laterally. This requirement is fulfilled by the application of the two pressure springs 22 (FIG. 6), namely by their inclined arrangement against each other and under 45° to the dividing plane of the housing. This arrangement does not interfere with the equalness and interchangeability of the two housing halves 16 and 16' but in addition it brings the advantage that without changing anything in the employed component parts it is possible during assembly of the roller nut of this invention to adjust the rolling cages either for the left-hand thread of the shaft or for the right-hand thread. To change the direction of thrust, it is needed only to remove springs 22 from the upper recesses as shown in FIG. 6 and replace them into the empty lower recesses. By this exchange, the rolling surfaces in the remaining lateral roller cages are automatically transferred to the opposite side of the shaft 11 and the condition for changing the direction of the pitch, or to provide the left hand or the right hand pitch, is fulfilled. The determination of the position of the two pressure springs has to be made during the installation and assembly of the roller nut. It is possible of course to construct roller nuts where the direction of pressure of the two springs 22 can be switched over even during the assembled and operative state of the roller nut. In this manner it would be possible without any changes in the direction of rotation of the shaft to induce a back-and-forth movement of the roller nut.

As can be seen from FIG. 5, also the threaded holes or bole holes in the housing halves for receiving screws 23 and 24 used for connecting the two parts of the housing 16 are arranged in such a manner that both halves of the housing 16 remain equal.

The main advantage of the arrangement of this invention results from the fact that due to the increased bevel angle between the end points of the area of rolling and the center of the roller cages (FIGS. 1 and 2) and due to the application of four instead of three roller cages, an approximately four-fold thrust load is possible in comparison with prior art devices of this kind.

As an other advantage of the rolling nut of this invention it can be considered the fact that if an excessive resistance acts against the movement of the nut or if the resistance is greater than the allowable thrust, the nut of this invention having four rollers starts sliding whereas in usual threaded spindles or worm gears the threads might become damaged.

Because of the low value of the specific pressure on the roller surface, in the case of slippage or sliding of the roller cages, no damage can occur in the rolling body and therefore unhardened, commercially available steel rods can be employed for the shafts. In spite of this, the efficiency of the roller nut of this invention remains high since only a low-loss rolling friction takes place in the contact surfaces. In contrast to normal screws where the self-stopping starts already at a pitch angle of about 10°, in the embodiment according to this invention is at angles between 2° to 3°. For practical use the pitch is an integer fraction of the diameter of the shaft; for example, 9° pitch angle is for 0.5 shaft diameter etc. The spring pairs 22 can be created so as to be pressure adjustable. This adjustment of the spring pressure makes it possible that the total thrust of the roller nut can be adjusted to a particular technological application in which it is employed such as for example in the overload protection.

It will be understood that each of the elements described above, or two or more together, may also find a useful application in other types of constructions differing from the types described above.

While the invention has been illustrated and described as embodied in a rolling nut including four roller cages, it is not intended to be limited to the details shown, since various modifications and structural changes may be made without departing in any way from the spirit of the present invention.

What is claimed as new and desired to be protected by Letters Patent is set forth in the appended claims:

1. An arrangement for transforming a rotary movement of a smooth shaft into a thrust movement of a rolling nut, said rolling nut comprising a housing and, within said housing, at least one roller cage surrounding said shaft and engaging a surface section of said shaft, the end portions of said section of engagement forming with the center of said cage a bevel angle substantially of 60°.

2. An arrangement as defined in claim 1, wherein said housing is assembled of two equal parts, the dividing plane between said parts intersecting the centers of said roller cages and the axis of said shaft.

3. An arrangement as defined in claim 2, wherein said housing parts are provided with bore holes for receiving fastening means, said parts together with said bore holes being interchangeable.

4. An arrangement as defined in claim 1, further comprising at least one pair of pressure springs arranged within said housing for urging said roller cage against said shaft.

5. An arrangement as defined in claim 4, wherein said housing has a rectangular configuration and said pair of springs project against said roller cage from opposite corners at one side of said housing.

6. An arrangement as defined in claim 5, wherein the corner portions of the housing are provided with symmetrically arranged recesses directed against the dividing plane of said housing at an angle of substantially 45°.

7. An arrangement as defined in claim 6, wherein said pair of springs project against said roller cages from any two adjacent ones of said recesses.

8. An arrangement as defined in claim 11 wherein said roller nut includes four sequentially arranged roller cages fixedly supported within said housing.

9. An arrangement as defined in claim 8, wherein pairs of pressure springs are directed against intermediate ones of said roller cages.

10. A rolling nut in combination with a smooth shaft for transforming the rotary movement of the shaft into a thrust movement of the nut, comprising a housing; a plurality of annular roller cages arranged in said housing at an angle one to another and each having an inner annular surface engageable with an outer surface portion of said shaft; the circumference of said inner annular surface of each cage being selected relative to the periphery of said shaft such that the line of contact between each cage and said shaft corresponds to the radian of substantially 60 degrees with respect to the center of said inner annular surface.

* * * * *